June 15, 1943.  W. P. LEAR  2,321,606
AIRCRAFT NAVIGATION INSTRUMENT
Filed May 15, 1940  2 Sheets-Sheet 1
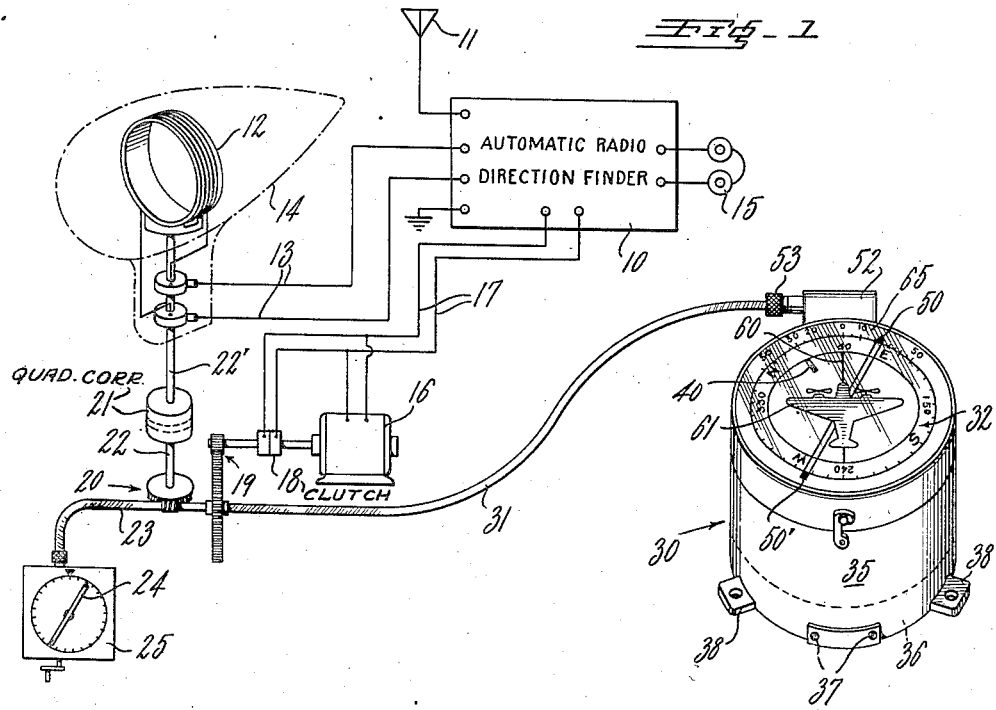
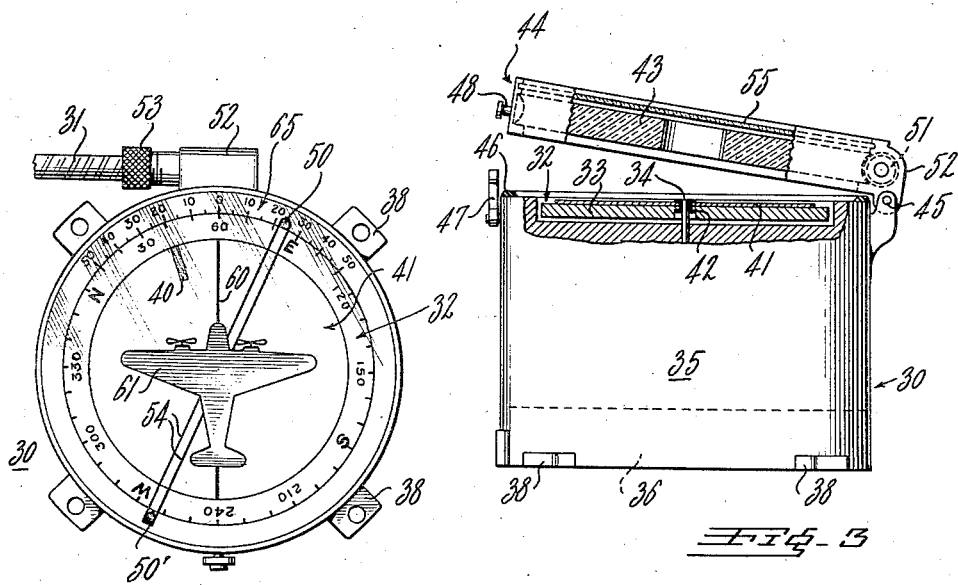
INVENTOR.
WILLIAM P. LEAR
BY
Richard A. Marsen
ATTORNEY.

June 15, 1943.  W. P. LEAR  2,321,606
AIRCRAFT NAVIGATION INSTRUMENT
Filed May 15, 1940  2 Sheets-Sheet 2
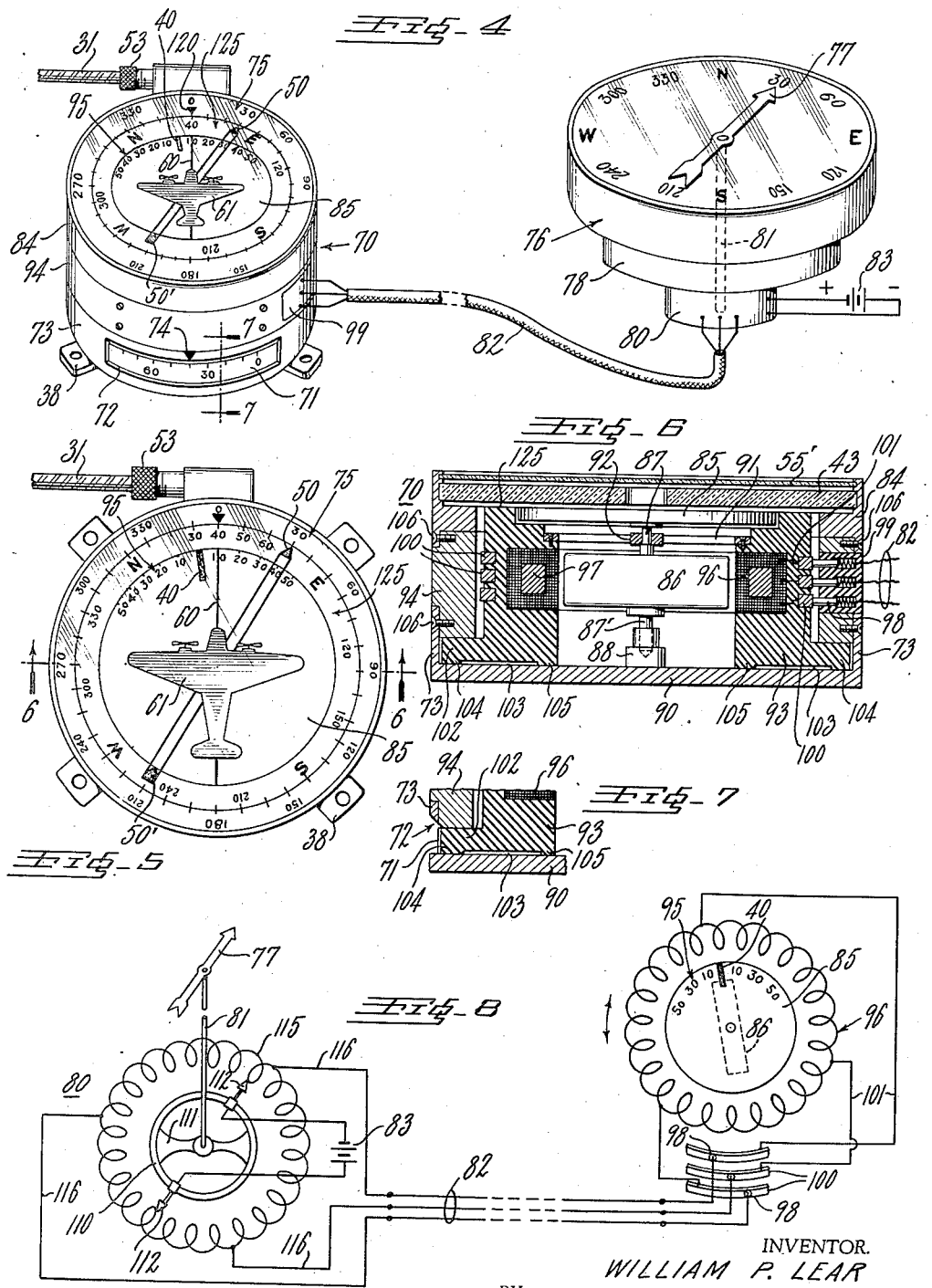
INVENTOR.
WILLIAM P. LEAR
BY Richard A. Marsen
ATTORNEY.

Patented June 15, 1943

2,321,606

UNITED STATES PATENT OFFICE 2,321,606

AIRCRAFT NAVIGATION INSTRUMENT

William P. Lear, Dayton, Ohio, assignor, by mesne assignments, to Lear Avia, Inc., Piqua, Ohio, a corporation of Illinois Application May 15, 1940, Serial No. 335,229

17 Claims. (Cl. 250—11)

This invention relates to navigational indication systems, and more particularly relates to a novel composite indicator directly solving and simplifying heretofore complex problems in aircraft navigation.

The trend of modern aircraft navigation is towards greater safety and reliability of operations and schedules as well as towards greater flexibility of maneuvering. Efforts have been directed to provide indications to effectively guide the pilot in his navigation despite difficult terrain or adverse weather conditions such as wind, rain, fog, and the like. The art, however, has developed complex systems for these purposes, requiring correlation of a number of separate indications, interpretations, and numerical calculations on the part of the already burdened pilot, as well as requiring a multitude of special ground radio and associated equipment.

In accordance with the present invention, aircraft navigation is reduced to simple terms, continuously affording the pilot automatic pictorial indications of his orientations and maneuvers, and reducing even the most advanced problems to simple, readily interpreted indications. The pilot is thus relieved of mental strain and uncertainty as to position or orientation, and is directly apprised of the best and most direct manner to navigate his aircraft under all conditions of flight. The only ground facility required in conjunction with the system of the invention is a single radio transmitter, of any type, in the vicinity or in the path of the destination.

With the system of the present invention, straight-track navigation along any desired radial heading is readily effected towards or away from a radio station, despite cross-winds or non-visibility. The angle of drift of the aircraft due to cross-winds is directly indicated, and automatically corrected for in flight. The composite instrument may be used as a regular 360° automatic radio direction finder and as a directional compass. With the system the pilot is enabled to confidently execute a direct low approach and blind descent onto a runway, regardless of local weather conditions. For instrument landing, the transmitter is located at the head of the selected runway.

The composite navigational indicator comprises a course index held angularly fixed in space parallel to the destination of the desired course, and an index giving an accurate bearing on a radio station in the path of the desired course. A further reference index is provided corresponding to the zero heading or "lubber line" of the aircraft. The "desired track" index is continuously orientated with a magnetic compass. The "radio track" index is controlled by a 360° azimuthally compensated automatic radio direction finder system tuned to the charted ground radio station. The composite navigational indicator accordingly performs the functions of a radio direction finder and a directional compass, as well as the important additional functions referred to above and to be described in detail hereinafter.

The present invention is a continuation-in-part of my copending application entitled "Radio navigation system," Serial Number 313,433, filed January 11, 1940, assigned to the same assignee as the present case. In the copending application, a directional gyroscope is disclosed as the spatial orienting means for the "desired track" index. In accordance with the present invention, a magnetic compass is directly incorporated with the composite indicator. In another form of the invention, a master magnetic compass is remotely coupled to the indicator through a telemetering arrangement. The "desired track" index of the composite indicator may be set manually to any desired angular position for spatial orientation and reference. This setting of the "desired track" index is with respect to the zero degree mark or the magnetic north index of the magnetic compass. The setting of the "desired track" is accomplished by shifting a movable scale disk after opening up the indicator instrument. In a modified form of the invention, a novel angular shifting arrangement is incorporated with the telemetering means simplifying the "desired track" adjustment procedure.

It is accordingly an object of the present invention to provide a novel composite navigational indicator system incorporating an automatic radio direction finder and magnetic compass.

Another object of the present invention is to provide a composite navigational indicator having a novel adjustable course index which is settable through externally accessible means.

A further object of the present invention is to provide a novel "desired track" index adjusting means for the composite indicator.

These and further objects of the present invention will become more apparent in the following description of exemplifications thereof illustrated in the drawings, in which:

Fig. 1 is a diagrammatic arrangement of a preferred embodiment of the navigational system of the invention.

Fig. 2 is a plan view of the navigational indicator.

Fig. 3 is an elevational view, partly in section, of one form of the navigational indicator.

Fig. 4 is a perspective illustration of a modified arrangement for the composite navigational indicator of the invention, incorporating a remote telemetering arrangement and course setting means.

Fig. 5 is a plan view of the composite indicator of Fig. 4.

Fig. 6 is a vertical cross-sectional view through the composite indicator, as taken along the line 6—6 of Fig. 5.

Fig. 7 is a cross-sectional detail of the indicator, as taken along the line 7—7 of Fig. 4.

Fig. 8 is a schematic electrical diagram of the remote telemetering arrangement of the indicator system corresponding to Fig. 4.

A preferred arrangement which the system of my present invention may assume in practice is diagrammatically illustrated in Fig. 1. The radio direction finder system gives automatic indications over 360 degrees, and may well be the one disclosed in my copending application, Serial No. 286,733, filed July 27, 1939, entitled "Automatic radio direction indicator," now Patent No. 2,308,521, issued Jan. 19, 1943, and assigned to the same assignee as this case. Equivalent automatic direction finders, capable of operating a bearing indicator over a 360° scale and giving a bearing on a tuned-in radio station, may instead be used. The illustrated direction finder comprises radio receiver and control circuit unit indicated at 10, to which is connected non-directional antenna 11 and rotatable directional or loop antenna 12 through leads 13. A streamline housing about loop antenna 12, indicated in dotted lines at 14, is used to reduce the aerodynamic drag of the loop antenna when mounted exterior of the aircraft. Earphones 15 are connected to direction finder unit 10 for continuous aural reception, useful for identifying the radio station tuned-in and for obtaining weather reports or landing instructions.

A reversible motor 16 is connected to the control circuit portion of direction finder unit 10 through leads 17, and is energized in accordance with the received radio signals to rotate in either direction in accordance with the sense of the radio signal as determined by the loop antenna 12 when in off-null position with respect to the incoming radio signal waves. The circuits and theory of this operation are described in my Patent No. 2,308,521. Motor 16 is coupled to drive loop antenna 12 through electromagnetic clutch 18 electrically connected in parallel with motor 16; reduction gearing 19; worm gearing 20; and quadrantal corrector unit 21 interposed between shafts 22 and 22' for loop antenna 12.

Quadrantal corrector unit 21 is used for compensating for non-symmetrical metallic surroundings about the loop antenna, which otherwise would cause false bearing indications. A suitable quadrantal corrector for the unit indicated at 21 is disclosed in my Patent No. 2,296,285, and my copending application Serial No. 344,854 filed July 11, 1940, entitled "Quadrantal compensator." An azimuthal or bearing indicator for the direction finder is indicated at 25 mechanically coupled to the gear systems 19 and 20 of the loop antenna drive through flexible cable 23. Indicator needle 24 of indicator 25 points out the angular position of the tuned-in radio station. This position directly corresponds to the angular position which loop antenna 12 assumes under the action of motor 16, and as compensated by corrector unit 21.

The composite navigational indicator is shown at 30. It is mechanically coupled to loop antenna 12 through flexible mechanical cable 31 directly connected to gearing 19 and indicator 25. The indicator 30 is shown in perspective in Fig. 1; in elevation and partly in section, in enlarged Fig. 3; and in plan view, in Fig. 2. Indicator 30 is mounted in the cockpit adjacent the pilot with its scales preferably arranged horizontally. Navigational indicator 30 embodies a magnetic compass arranged to maintain directional scale 32 in predetermined orientations. Directional scale 32 is graduated in 360 degrees, and represents the land reference scale of the composite indicator. The zero index of scale 32 corresponds to the magnetic north index of the magnetic compass.

An enlarged plan view of indicator 30, Fig. 2, shows the preferred arrangement of the respective scales and indices. Fig. 3 is an elevational view of the indicator 30 with the cover open, partially broken away to show its details of construction. Directional scale 32 is etched or otherwise inscribed about the top peripheral surface of a turn-table 33 attached to a vertical rod 34 extending from the interior of the magnetic compass mechanism within housing 35 of the unit. The magnetic compass may be of any suitable standard construction, preferably with a slow period of indication and negligible overswing. The zero or magnetic north index N of directional scale 32 corresponds to such indication of the compass with respect to magnetic north. A compensator is preferably included with the magnetic compass as indicated at dotted section 36 thereof, to compensate for local magnetic interference and deviation of the magnetic field. Adjusting screws, indicated at 37, are used for arranging the magnetic compensaton in a well known manner. Lugs 38 project from housing 35 for suitably fastening indicator 30 in a horizontal position.

The "desired track" index comprises bar 40, preferably of luminous material, inscribed on disk 41. Disk 41 is adjustably mounted on turntable 33, as with an eyelet 42. "Desired track" index 40 is set or otherwise manually moved opposite the reading on directional scale 32 corresponding to the angular course it is desired to fly, as will be more fully described hereinafter. The reading of "desired track" index 40 in Figs. 1 and 2 is 40° (on scale 32).

An important feature of the present invention is the correlation of automatic radio directional bearings with "desired track" indications 40. Towards this end, a "radio track" index 50, 50' is provided coaxial with the scales and indices of indicator 30. "Radio track" index 50, 50' is inscribed on a transparent gear 43, rotatably arranged within lid 44 of the indicator. Transparent gear 43 may be of a plastic material, such as for example the one commercially known as "Lucite." Lid 44 is pivoted on hinge 45, and closes against a rubber gasket 46 on the top peripheral edge of housing 35 for effectively sealing the instrument when closed. A latch 47 operates on a pin 48 projecting from lid 44.

Transparent gear 43 coacts with a worm gear, indicated in dotted lines at 51, encased in a projecting enclosure 52 thereof on lid 44. Worm gear 51 is coupled to flexible cable 31 through removable coupling element 53. "Radio track"

index 50, 50' is accordingly oriented by the automatic direction finder system described in connection with Fig. 1, to point directly to the radio transmitter tuned to. The bearing accuracy at "radio track" index 50, 50' is in practice within one degree. There is no directional ambiguity. The angular orientation of "radio track" index 50, 50' corresponds to the radio bearing indications by needle 24 of azimuth indicator 25. The bearings are quadrantally compensated through quadrantal compensator 21 at the loop antenna.

Head and tail portions 50, 50' of the "radio track" index are preferably of luminous material. Two parallel lines 54, of wire or suitable inscription on gear 43, connect the "radio track" index sections 50, 50'. Coincident readings of "desired track" index 40 and "radio track" index 50, 50' are thus free of parallax. This is important when the instrument is used for accurate straight track navigation.

A transparent cover pane or window 55 is sealed in the top of lid 44. Window 55 contains the aircraft zero index or fixed "lubber line" reference index 60. Reference index 60 corresponds to the direction of flight of the aircraft in still air. A pictorial representation of an aircraft 61 is provided, in alignment with reference index 60, to assist in the pictorial representation and "illusion" by the composite indications of the indicator. The arrangement of the scales and indices as well as the transparent gear 43 support and drive means corresponds to that disclosed in my copending application, Serial Number 313,433 referred to above, and reference is made thereto for further details of construction. A reference scale 65 is inscribed on fixed pane 55 as indicated in Figs. 1 and 2, with its zero index mark opposite fixed reference or "lubber line" index 60, calibrated in degrees equally from either side of zero.

*Aircraft navigation with the composite indicator*

The composite navigational indicator of the invention automatically and accurately informs the pilot by pictorial indications how best to navigate the aircraft under all conditions of flight. The use of and operation with the composite indicator described herein, incorporating the magnetic compass, is equivalent to that described in my copending application, Serial Number 313,433, referred to. The substitution of the magnetic compass directly for the gyro-compass makes a vacuum drive connection unnecessary, and permits the lid 44 to be opened in flight for direct manual resetting of "desired track" index 40. Furthermore, resetting or checking of gyroscale readings are unnecessary, since the magnetic compass always points to magnetic north as the reference. The spatial orientation of directional scale 32 is corrected for magnetic deviation due to compensator unit 36. Zero index N of scale 32 points to the magnetic north. The "desired track" index 40 is set opposite the scale reading on directional scale 32 to correspond to the desired course to be flown, corrected for magnetic variation of the locality, easterly or westerly, as will be described hereinafter.

Problems in aircraft navigation are directly resolved with the indicator, relieving the pilot of mental strain, calculations and uncertainty. The indications are quickly and easily interpreted, reducing the most advanced navigational problems to simple terms. With the system, a pilot can readily fly "blind," i. e. by instrument, along any desired radio course, heading towards or away from any radio station in any desired radial direction, and traveling a predetermined straight track over the ground regardless of wind force or direction. The angle of drift or crab of the aircraft due to cross-winds is directly ascertained by the indications, and automatically corrected for in flight. The composite instrument of the invention serves as the usual directional magnetic compass in the aircraft, thus eliminating the installation of a separate one. The automatic uni-directional 360° radio course indicator incorporated in the system may be used independently as such for homing, and radio directional flight in general. A distinct indication is obtained when the aircraft passes over the radio station, by a 180° reversal of the "radio track" index (50, 50'). The system is also most advantageously used for effecting a low approach and instrument landing on a selected runway.

Only a single ground radio transmitter station is necessary for navigation with the instrument of the invention. The largest airliner, bomber or clipper may be navigated on a straight-track to any out-of-the-way airport having a simple radio transmitter and safely "blind-landed" on the local airport or seaport. The pilot simply tunes-in the radio station, ascertains the selected course or runway in degrees, sets his "desired track" index 40 accordingly, and is then prepared to effect a direct instrument approach and descent to the runway. The navigation and landing maneuvers are rendered foolproof and safe regardless of wind velocity or other weather conditions. Reference is made to Figs. 9 to 17 and the attendant description in my copending application, Serial Number 313,433, for an exposition of the uses and advantages of the composite indicator corresponding to the present invention.

The basic principle of the indications of the system of the invention is readily comprehended by the pilot. It consists in correlating:

(1) A desired track index 40, continuously held angularly fixed in space parallel with the course desired (although movable with respect to the aircraft);

(2) A continuous radio bearing 50 on a transmitter on the desired course; and (3) A lubber line 60, the stationary reference index of the aircraft itself.

Each indication may be used independently of the other. However, when correlated, they directly and automatically resolve even the most complex navigational problems for the pilot. Pilot training time is kept at the minimum, and maneuvering efficiency is increased to a maximum.

Straight track navigation towards a radio station is effected, automatically compensated for drift due to cross-winds, by maintaining "radio track" index 50 coincident with "desired track" index 40. The angle which coincident indices 40 and 50 makes with "lubber line" 32 is the drift angle of the aircraft, indicating the attitude of the aircraft with respect to the course of flight. The pilot, in a similar manner, can fly a predetermined straight track in any radial direction away from a radio station by keeping tail 50' of the "radio track" indicator coincident with "desired track" index 40.

The three indices tell the pilot the whole story in the simplest pictorial terms. Interpretation of the readings is practically intuitive. All navigational maneuvers are performed by the pilot with a minimum of calculation or interpretation. Only a single ground radio transmitter is necessary to complete the whole system, which station may be a commercial broadcast station, simple voice transmitter, Coast Guard station, radio range, etc.

The setting in degrees of "desired track" index 40 with respect to directional scale 32 depends on several navigational factors. The "desired track" is identical in degrees with the "magnetic compass course" for the destination, in degrees. The primary factor entering into the determination of the "magnetic compass course" and the "desired track" is the geometric bearing in degrees of the course or destination of flight with respect to true north. Such true bearing is generally termed the "true course." The easterly or westerly magnetic variation, in degrees, for the vicinity, is respectively subtracted from or added to the "true course," to derive the "magnetic course." Where a magnetic compensator 36 is not used, deviation in degrees of the actual magnetic compass readings from true magnetic readings is used to correct the "magnetic course" to derive the desired "magnetic compass course" or generally termed "compass course." With the compensator the magnetic deviations are automatically accounted for.

The "compass course" is the degrees as read on a magnetic compass for straight alignment to a destination from a given position. The significance and mode of determination of the "compass course" in degrees is well known to those versed in the art of navigation, and is clearly explained in Chapter III of the publication "Practical Air Navigation" by Thorburn C. Lyon of the U. S. Department of Commerce, published in 1929 by the U. S. Government Printing Office, Washington, D. C. The "desired track" index 40 is adjusted to read the "compass course" for the destination, in degrees, on directional scale 32. This is performed by opening up lid 44, and manually rotating disc 41 until index 40 reads properly on scale 32. An arrangement for adjusting index 40 without opening up lid 41 is disclosed hereinafter in connection with the modified form of the invention, shown in Figs. 4 to 8.

*Modified composite indicator arrangement*

A modified arrangement for the composite indicator is shown in perspective at 79 in Fig. 4. In indicator 70 the adjustment of "desired track" index 40, in accordance with the course to be navigated, is performed without opening up the instrument. The adjustment is performed through movable scale 71, visible behnd slotted opening 72 in lower casing section 73. "Desired track" index 40 is adjusted by simply turning scale 70 with respect to index mark 74 on casing 73, as will be presently described. Composite indicator 70 contains a "radio track" index 50, 50', geared through flexible cable 31 to an automatic direction finder unit such as described in connection with Fig. 1, affording continuous azimuthal radio bearings with respect to the radio station tuned-in, and read on outer concentric scale 75. Fig. 5 shows the composite scales of indicator 70 in enlarged plan view.

The composite indicator unit 70 does not contain a directional compass, corresponding to the magnetic compass of the unit 30 previously described, or corresponding to the directional gyro disclosed in my copending application, Serial Number 313,433. In accordance with the modified form of the invention, the master directional compass unit of the vehicle is used, which may be remote from the composite indicator 70. In Fig. 4, a master magnetic compass 76 is shown, which may be of any standard type. Magnetic compass 76 contains the usual pointer 77. A compensator unit schematically indicated at 78 is preferably incorporated with the magnetic compass. The rotatable portion of the magnetic compass 76, connected to pointer 77, is coupled with the composite indicator 70 through a telemetering system. An electrical telemetering arrangement is shown, specifically a direct current telemetering system of the Selsyn type.

The telemetering transmitter is shown at 80, coupled to the movable pointer mechanism of the compass by shaft 81, as schematically indicated in dotted lines. The transmitter 80 is connected by electrical cable 82 to a translater or repeater unit incorporated within indicator 70. A direct current source 83 is in circuit with transmitter 80. It is to be understood that a directional gyro may be employed as the directional compass reference unit in place of the master magnetic compass 76. The transmitter of the telemetering arrangement, corresponding to unit 80 of Fig. 4, is in the latter case coupled to the directional gyro, for example in a manner such as illustrated in Fig. 8 of my copending application Serial No. 313,433 referred to.

Cross-sectional Fig. 6 through indicator 70 shows the arrangement thereof for telemetering the directional compass bearings to the indicator, and the novel means for adjusting the "desired track" index 40. Transparent radio bearing gear 43 is rotatably mounted in the upper casing section 84 of instrument 70, and contains "radio track" index 50, 50'. Cover pane or window 55' at the top of casing section 84, contains reference or "lubber line" index 60, aircraft representation 61 and fixed 360° azimuthal scale 75. A turn-table 85 is rotatably supported within instrument 70 and is coupled to the rotor 86 of the telemetering repeater unit by shaft 87. The lower extending portion 87' of the rotor shaft 87 is supported in central bearing element 88 secured to the base 90 of instrument 70. A supporting spider 91 contains central bearing element 92 for supporting rotor shaft 87. Turn-table 85 has the "desired track" index 40 inscribed on its exposed upper surface. A reference scale 95 is marked in degrees on either side of index 40. The drift or crab angle of the aircraft in flight is derived directly from reference scale 95 when read with respect to "lubber line" 60. Such reading is taken when "desired track" index 40 is coincident with "radio track" index 50, signifying straight track navigation with instrument 70.

A tubular member 93 is rotatably supported within composite indicator 70. Member 93 is preferably of insulation material, such as Bakelite or other suitable composition. The toroidal stator winding 96 of the repeater unit is encased in member 93 as clearly shown in Fig. 6. A magnetic core 97 is concentric within stator winding 96. Stator 96 is arranged concentrically about rotor 86, for actuating the rotor in accordance with signals from transmitter 80. Three-wire cable 82 from transmitter 80 is electrically connected with winding 96 through brushes 98 supported in an insulation block 99 mounted in casing section 94. Brushes 98 individually coact with slip rings 100 mounted about tubular member 93. Slip rings 100 are connected to stator coil 96 through wires 101.

Tubular member 93 contains an annular extension 102 slidably arranged between central casing section 94 and base 90 of instrument 70. A concentric groove 103 is cut in member 93 to reduce its frictional drag on the inner surface of base 90, and forming two spaced concentric annular leg portions 104, 105 for sliding thereon. The outer ends of spider 91 are supported on member 93 to in turn hold turn-table 85 and rotor 86 in rotatable alignment centrally of instrument 70. The casing of instrument 70 comprises upper section 84, central section 94 and bottom section 73 containing base 90. Upper and lower sections 84 and 73 overlap central section 94, being joined thereto by screws 106. Rotatable member 93 is thus stably supported within the housing of instrument 70, and carries stator coil 96 of the repeater unit in continuous electrical relation with brushes 96 connected to cable 82 of the telemetering system. Partial sectional view Fig. 7 shows movable scale 71 projecting through slotted opening 72 in lower casing section 73. The setting of tubular member 93, and associated stator winding 96, is accomplished by manual operation of projecting scale 71.

Fig. 8 is a schematic electrical diagram of the telemetering arrangement between the rotatable section 81 of master compass 76, and turn-table 85 of the composite indicator. The rotatable compass element, schematically represented in Fig. 8 by shaft 81 coupled to compass pointer 77, is connected to brush carrier 110 of transmitter 80 through spider 111. Brushes 112, 112 coact with toroidal stator winding 115 of transmitter 80. Battery 83 is connected between brushes 112, 112. Equi-distant taps 116 on winding 115 properly connect winding 115 to three-wire cable 82. Stator winding 115 of transmitter 80 and stator winding 96 of the repeater unit within instrument 70 are thus in continuous connection through three-wire cable 82.

In accordance with the modified form of the invention, stator winding 96 of the repeater unit is displaceable in space phase with respect to fixed stator winding 115 of transmitter 80. The space phase displacement is accomplished by turning member 93 within indicator unit 70 through exposed scale 71. The amount of the space phase displacement corresponds to the rotation of scale 71, indicated by index 74 on the indicator casing as shown in Fig. 4. Scale 71 is graduated in 360°. Its 0° position on index 74 corresponds to a zero or no space phase displacement between the position of rotor 86 of the repeater unit, and the rotor of transmitter 80 coupled to compass needle 77.

The displacement of scale 71 in Figs. 4 and 5 is 40° counterclockwise. Rotor 86, carrying turn-table 85, is accordingly displaced 40° counterclockwise, representing a space phase displacement with respect to the readings of the master compass 76. A 360° compass scale 125 is inscribed on the upper peripheral surface of tubular member 93. Scale 125 is concentric between outer 360° azimuthal scale 75, and inner reference scale 95, on turn-table 85. The reading of scale 125 opposite the zero reference index 120 of fixed scale 75, represents the actual angular displacement of member 93 from its zero position. This reading of scale 125 in Figs. 4 and 5 is 40°, which is the same as the reading of scale 71 opposite index 74. Since repeater stator winding 96 is fixed in and carried by member 93, its space phase displacement with respect to its zero position is identical with that of member 93.

The positions of repeater rotor 86, and therefore turn-table 85, is accordingly altered by an amount equal to the space phase displacement in its transmission of the readings of the master compass 76. In the illustrated case, "desired track" index 40 is oriented 40° less than the readings on the master compass due to the 40° counterclockwise rotation of scale 71. It is to be understood that for any different setting of scale 71, "desired track" index 40 will be altered by a corresponding amount with respect to the readings of the master compass. The 30° reading of needle 71 of magnetic compass 76 shown, is accordingly translated as a 350° indication of "desired track" index 40 with respect to the fixed azimuthal scale 75 of the composite indicator 70. The actual reading of the remote compass 76 may be directly ascertained on composite indicator 70 by noting the indication of "desired track" index 40 on the central 360° directional scale 125.

The composite indicator 70 may be used for the various navigational maneuvers described hereinabove in connection with indicator 30, and also those described in my copending application, Serial Number 313,433. The adjustment of "desired track" index 40 is accomplished on indicator 70 by simply moving scale 71 with respect to index 74 to impart the proper orientation thereof in accordance with the principles of operation of the system previously described. By coupling a plurality of composite indicators of the type 70 to a master automatic direction finder system (through appropriate flexible cables corresponding to 31), and to a master compass or directional gyroscope (through suitable telemetering arrangements), a pilot, co-pilot, navigator as well as other persons aboard a large airship, may have individual indicators. Such plural indicator system is economical of master directional equipment and insures uniform indications throughout.

Although I have described preferred embodiments for carrying out the principles of my present invention, it is to be understood that modifications thereof, both as to construction and operation, may be practiced without departing from the broader principles and scope of the invention, as expressed in the following claims.

What I claim is:

1. In a navigational system having an automatic radio direction finder and a directional compass: a composite indicator of the character described comprising a radio track index for coupling with the automatic radio direction finder to indicate the bearing to a radio transmitter, a desired track index coaxially arranged with said radio track index, a telemetering arrangement including a repeater unit connected to said desired track index and responsive to a transmitter unit coupled to the compass to spatially orient the desired track index in correspondence with indications of the compass, said telemetering arrangement having means for effecting a preferred space phase displacement between said units for correspondingly altering indications of said desired track index with respect to indications of said radio track index.

2. In a navigational system of the character described, the combination of automatic radio direction finding means responsive to signals received from a radio transmitter, a directional compass, a composite indicator comprising a radio track index and a desired track index coaxially arranged, mechanism coupling said radio track index with said direction finding means for continuously indicating the bearing to the radio transmitter, an electrical telemetering device remotely coupling said desired track index with said compass for spatially orienting said desired track index in accordance with indications of said compass, said telemetering device having means for electrically adjusting the space phase therein for correspondingly altering the indications of said desired track index with respect to indications of said compass.

3. In a navigational system of the character described, the combination of uni-directional automatic radio direction finding means responsive to signals received from a radio transmitter including motor means operable in accordance with the bearing direction of the signals, a directional compass, a composite indicator comprising a radio track index and a desired track index coaxially arranged, mechanism coupling said radio track index with said motor means for continuously indicating the bearing to the radio transmitter over 360° of arc, an electrical telemetering device remotely coupling said desired track index with said compass for spatially orienting said desired track index in accordance with indications of said compass, said telemetering device having means for adjusting the space phase between the indications of said desired track index with respect to indications of said compass.

4. In a navigational system having a uni-directional automatic radio direction finder including motor means operable in accordance with the bearing direction of received radio signals, and a directional compass: a composite indicator of the character described comprising a radio track index for coupling with said motor means to indicate the bearing to a radio transmitter over 360° of arc, a desired track index coaxially arranged with said radio track index on the indicator, a telemetering repeater unit mounted in the indicator and directly coupled to said desired track index, said repeater unit being connectable to a telemetering transmitter at the compass to spatially orient the desired track index in correspondence with indications of the compass, said telemetering repeater unit containing means for effecting a preferred space phase displacement between indications of said desired track index with respect to indications of said radio track index.

5. In a navigational system having a uni-directional automatic radio direction finder including motor means operable in accordance with the bearing direction of received radio signals, and a directional compass: a composite indicator of the character described comprising a radio track index for coupling with said motor means to indicate the bearing to a radio transmitter over 360° of arc, a desired track index coaxially arranged with said radio track index, a telemetering arrangement including a repeater unit rigidly connected to said desired track index and responsive to a transmitter unit coupled to the compass to spatially orient the desired track index in correspondence with indications of the compass, said telemetering arrangement having means for effecting a preferred space phase displacement between said units for correspondingly altering indications of said desired track index with respect to indications of said radio track index.

6. In a navigational system of the character described, the combination of uni-directional automatic radio direction finding means responsive to signals received from a radio transmitter including motor means operable in accordance with the bearing direction of the signals, a magnetic compass, a composite indicator comprising a radio track index and a desired track index coaxially arranged, mechanism coupling said radio track index with said motor means for continuously indicating the bearing to the radio transmitter over 360° of arc, an electrical telemetering device including a transmitter coupled to said compass and a repeater coupled to said desired track index for spatially orienting said desired track index in accordance with indications of said compass, said telemetering device having means for adjusting the space phase between said transmitter and said repeater for correspondingly altering the indications of said desired track index with respect to indications of said compass.

7. In a navigational system having a uni-directional automatic radio direction finder including motor means operable in accordance with the bearing direction of received radio signals, and a directional compass: a composite indicator of the character described comprising a radio track index for coupling with said motor means to indicate the bearing to a radio transmitter over 360° of arc, a scale concentric with said radio track index, a desired track index rotatably arranged coaxially with respect to said scale, a telemetering arrangement including a repeater unit rigidly connected to said desired track index and responsive to a transmitter unit coupled to the compass to spatially orient the desired track index in correspondence with indications of the compass; said telemetering arrangement having means for effecting a preferred angular displacement between said units for correspondingly altering indications of said desired track index with respect to said scale.

8. In a navigational system having a uni-directional automatic radio direction finder including motor means operable in accordance with the bearing direction of received radio signals, and a directional compass: a composite indicator of the character described comprising a radio track index for coupling with said motor means to indicate the bearing to a radio transmitter over 360° of arc, a 360° scale concentric with said radio track index, a desired track index rotatably arranged coaxially with respect to said scale, a telemetering arrangement including a repeater unit connected to said desired track index and responsive to a transmitter unit coupled to the compass to spatially orient the desired track index in correspondence with indications of the compass; said telemetering arrangement having means for effecting a preferred angular displacement of indications of said desired track index with respect to said scale, and a second 360° scale attached to said means for angular displacement thereby in accordance with that effected between said units, said second scale being arranged to be visible with and concentric with said indices and positioned between said first mentioned 360° scale and said desired track index to constitute a compass bearing reference therefor.

9. In a navigational system having an automatic radio direction finder and a directional compass: a composite indicator of the character described comprising a radio track index coupled to the automatic radio direction finder for indicating the bearing to a radio transmitter, a desired track index coaxially arranged with said radio track index, a casing for said indicator, an electrical telemetering repeater unit rotatably mounted in said casing and coupled with said desired track index, said repeater being electrically responsive to a telemetering transmitter at the compass to spatially orient the desired track index in correspondence with indications of the compass, and means for angularly displacing the stator of said repeater unit with respect to said casing to correspondingly effect an electrical space phase displacement between said repeater and said transmitter for correspondingly altering the indications of the desired track index with respect to indications of the radio track index.

10. In a navigational system having a unidirectional automatic radio direction finder including motor means operable in accordance with the bearing direction of received radio signals, and a directional compass: a composite indicator of the character described comprising a radio track index for coupling to said motor means to indicate the bearing to a radio transmitter over 360° of arc, a casing for said indicator, a scale for said radio track index attached to said casing, a desired track index coaxially arranged with said radio track index and said scale, a telemetering repeater unit mounted in the indicator and coupled to said desired track index, said repeater unit being connectable to a telemetering transmitter at the compass to spatially orient the desired track index in correspondence with indications of the compass; said telemetering repeater unit containing means for effecting a preferred space phase displacement of indications by said desired track index with respect to said scale.

11. In a navigational system having a unidirectional automatic radio direction finder and a directional compass: a composite indicator of the character described comprising a radio track index for coupling to said automatic radio direction finder to indicate the bearing to a radio transmitter over 360° of arc, a casing for said indicator, a scale for said radio track index attached to said casing, a desired track index coaxially arranged with said radio track index and said scale, an electrical telemetering repeater unit having its stator rotatably mounted in said casing and its rotor coupled with said desired track index, said repeater being electrically responsive to a telemetering transmitter at the compass to spatially orient the desired track index in correspondence with indications of the compass, and means for angularly displacing said stator with respect to said casing to correspondingly effect a space phase displacement of indications by the desired track index with respect to said scale.

12. In a navigational system having an automatic radio direction finder and a directional compass: a composite indicator of the character described comprising a radio track index for coupling with the automatic radio direction finder to indicate the bearing to a radio transmitter, a desired track index coaxially arranged with said radio track index, an electrical telemetering repeater coupled with said desired track index, said repeater being connectable with a transmitter at the compass for spatially orienting the desired track index in correspondence with indications of the compass, said repeater comprising a rotatably mounted element, a winding mounted on said element, and a rotor cooperative with said winding and fixedly coupled with said desired track index, means for effecting a displacement between indications of said desired track index and indications of said radio track index, said means embodying an instrumentality on said element in electrical connection with said winding, and members mounted on said indicator in continuous electrical contacting relation with said instrumentality and winding.

13. In a navigational system having an automatic radio direction finder and a directional compass: a composite indicator of the character described comprising a radio track index coupled to the automatic radio direction finder for indicating the bearing to a radio transmitter, a desired track index coaxially arranged with said radio track index, a casing for said indicator, an electrical telemetering arrangement coupling said desired track index with the compass for spatially orienting the desired track index in correspondence with indications of the compass; said telemetering arrangement comprising an element rotatably supported in said casing, a winding secured to said element, and a rotor cooperative with said winding and secured with said desired track index, and means for effecting a preferred space phase displacement of indications of said desired track index and indications of said compass, said means embodying slip rings on said element in electrical connection with said winding and brushes insulatingly mounted on said casing and in continuous electrical contact with said slip rings and winding.

14. In a navigational system having an automatic radio direction finder and a directional compass: a composite indicator of the character described comprising a radio track index coupled to the automatic radio direction finder for indicating the bearing to a radio transmitter, a desired track index coaxially arranged with said radio track index, a casing for said indicator, an electrical telemetering arrangement for coupling said desired track index with the compass for spatially orienting the desired track index in correspondence with indications of the compass; said telemetering arrangement comprising an element rotatably supported in said casing, a winding secured to said element, and a rotor cooperative with said winding and secured with said desired track index; and means for effecting a preferred space phase displacement of indications of said desired track index and indications of said compass, said means embodying slip rings on said element in electrical connection with said winding and brushes insulatingly mounted on said casing and in continuous electrical contact with said slip rings and winding, and with a telemetering transmitter attached to a movable index of said compass, a portion of said element extending to the exterior of said indicator for manual rotatable adjustment thereof to effect the space phase displacement.

15. In a navigational system having a unidirectional automatic radio direction finder and a directional compass: a composite indicator of the character described comprising a radio track index for coupling with the automatic radio direction finder to indicate the bearing to a radio transmitter over 360° of arc, a desired track index coaxially arranged with said radio track index, a casing for said indicator, an electrical telemetering arrangement coupling said desired track index with the compass for spatially orienting the desired track index in correspondence with indications of the compass, said telemetering arrangement comprising an element rotatably supported in said casing, a winding mounted on said element, and a rotor cooperative with said winding and fixedly coupled to said desired track index; and means for effecting an angular displacement of indications of said desired track index with respect to indications of said compass, said means embodying apparatus on said element in electrical connection with said winding and contact members insulatingly mounted on said casing in continuous electrical contact with said apparatus and winding; an annular portion of said element extending to a slot in said casing for manual rotatable displacement thereof; and a scale on the extending element portion for indicating the angular displacement of said element with respect to a zero index on said casing.

16. In a navigational system having a unidirectional automatic radio direction finder and a directional compass: a composite indicator of the character described comprising a radio track index for coupling to the automatic radio direction finder to indicate the bearing to a radio transmitter over 360° of arc, a casing for said indicator, a scale for said radio track index attached to said casing, a desired track index coaxially arranged with said radio track index and said scale; an electrical telemetering arrangement for coupling said desired track index with the compass for spatially orienting the desired track index in correspondence with indications of the compass, said telemetering arrangement comprising an element rotatably supported in said casing, a winding mounted on said element, and a rotor cooperative with said winding and positively coupled to said desired track index; and means associated with said telemetering arrangement for effecting a preferred space phase displacement of indications of said desired track index with respect to indications of said compass; said means containing an instrumentality on said element in electrical connection with said winding, members insulatingly mounted on said casing in continuous electrical contact with said instrumentality and winding, said members being connectable with a telemetering transmitter unit attached to a movable index of the compass; a portion of said element extending to a slot in said casing for rotatable adjustment thereof; and a 360° scale on said element concentric with the indices, and constituting a compass bearing reference for said desired track index.

17. In a navigational system having a unidirectional automatic radio direction finder and a directional compass: a composite indicator of the character described comprising a radio track index for coupling to the automatic radio direction finder to indicate the bearing to a radio transmitter over 360° of arc, a casing for said indicator, a scale for said radio track index attached to said casing, a disc containing a desired track index coaxially arranged with said radio track index and said scale; an electrical telemetering arrangement coupling said disc with the compass for spatially orienting the desired track index in correspondence with indications of the compass, said telemetering arrangement comprising an element rotatably supported in said casing, a winding mounted on said element, and a rotor cooperative with said winding and coupled to said disc; and means for effecting an angular displacement between indications of said desired track index and indications of said compass, said means embodying slip rings on said element in electrical connection with said winding, and brushes insulatingly mounted on said casing in continuous electrical contact with said slip rings and winding, said brushes being connectable with a telemetering transmitter unit attached to a movable index of the compass; an annular portion of said element extending to a slot in said casing for manual rotatable displacement thereof, a 360° scale on the extending element portion for indicating the angular displacement of said element with respect to a zero index on said casing; and a compass rose on said element arranged concentric with said indices and positioned between said first mentioned scale and said disc, constituting a compass bearing reference for said desired track index.

WILLIAM P. LEAR.